United States Patent
Robert et al.

(10) Patent No.: US 7,682,593 B2
(45) Date of Patent: Mar. 23, 2010

(54) PROCESS FOR THE PRODUCTION OF GE BY REDUCTION OF GECL$_4$ WITH LIQUID METAL

(75) Inventors: Eric Robert, Liège (BE); Tjakko Zijlema, Rotselaar (BE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 11/663,795

(22) PCT Filed: Sep. 16, 2005

(86) PCT No.: PCT/EP2005/010155

§ 371 (c)(1),
(2), (4) Date: Apr. 1, 2008

(87) PCT Pub. No.: WO2006/034802

PCT Pub. Date: Apr. 6, 2006

(65) Prior Publication Data

US 2008/0311027 A1    Dec. 18, 2008

Related U.S. Application Data

(60) Provisional application No. 60/622,806, filed on Oct. 29, 2004.

(30) Foreign Application Priority Data

Sep. 29, 2004    (EP)    .................................. 04077675

(51) Int. Cl.
C01G 19/08    (2006.01)
C22B 25/00    (2006.01)
C22B 41/00    (2006.01)
C01D 3/14    (2006.01)

(52) U.S. Cl. .................... 423/494; 75/689; 205/771; 423/89

(58) Field of Classification Search .................. 75/689, 75/395; 423/89, 618, 494; C01G 7/04; C22B 5/02, C22B 5/18, 41/00
See application file for complete search history.

(56) References Cited

U.S. PATENT DOCUMENTS

| 3,000,726 | A | * | 9/1961 | Spedding et al. | .............. 75/395 |
| 4,032,328 | A | * | 6/1977 | Hurd | ........................... 75/395 |
| 4,090,871 | A |   | 5/1978 | Lebleu et al. | |
| 4,533,387 | A |   | 8/1985 | Holland et al. | |
| 4,655,825 | A | * | 4/1987 | Hard et al. | ..................... 420/1 |
| 2004/0123700 | A1 | | 7/2004 | Zhou et al. | |
| 2004/0261573 | A1 | | 12/2004 | Zhou et al. | |

FOREIGN PATENT DOCUMENTS

| GB | 794 641 | | 5/1958 |
| JP | 11-011925 | | 1/1999 |
| JP | 11011925 | * | 1/1999 |
| JP | 11-209103 | | 8/1999 |
| SU | 366223 | | 2/1971 |

OTHER PUBLICATIONS

Gmelin's Handbuch der anorganischen Chemie, (1958) band 45, p. 32-33, p. 33, last paragraph.

* cited by examiner

*Primary Examiner*—Roy King
*Assistant Examiner*—Alexander Polyansky
(74) *Attorney, Agent, or Firm*—Brinks, Hofer, Gilson & Lione

(57) ABSTRACT

The invention relates to the manufacture of high purity germanium for the manufacture of e.g. infra red optics, radiation detectors and electronic devices. GeCl$_4$ is converted to Ge metal by contacting gaseous GeCl$_4$ with a liquid metal M containing one of Zn, Na and Mg, thereby obtaining a Ge-bearing alloy and a metal M chloride, which is removed by evaporation or skimming. The Ge-bearing alloy is then purified at a temperature above the boiling point of metal M. This process does not require complicated technologies and preserves the high purity of the GeCl$_4$ in the final Ge metal, as the only reactant is metal M, which can be obtained in very high purity grades and continuously recycled.

8 Claims, No Drawings

PROCESS FOR THE PRODUCTION OF GE BY REDUCTION OF GECL₄ WITH LIQUID METAL

This application is a National Stage application of International Application No. PCT/EP2005/010155, filed Sep. 16, 2005, which claims the benefit of U.S. Provisional Application No. 60/622,806, filed Oct. 29, 2004, and European Application No. 04077675.9, filed Sep. 29, 2004, their entire contents hereby incorporated herein by reference in their entirety.

The invention relates to the manufacture of high purity germanium for use in e.g. infrared optics, radiation detectors and electronic devices. The Ge metal is obtained by direct reduction of $GeCl_4$, a product that is commonly available in high purity grades.

According to present practice, $GeCl_4$ is converted to Ge metal by hydrolysis to $GeO_2$ and subsequent hydrogen reduction. This is a costly and time-consuming process in which much of the initial purity of the $GeCl_4$ is lost.

Another known route is the direct reduction of $GeCl_4$ with zinc vapour. Gmelin's Handbook der Organischen Chemie, band 45, 1958, p. 33, briefly describes such a process, whereby $GeCl_4$ reacts with Zn vapour at 930° C., producing $ZnCl_2$ and a Ge-Zn alloy. The Zn content in this alloy is first reduced to 0.1 to 0.2 wt. % by leaching with diluted HCl. The remainder of the Zn is removed by vacuum evaporation, resulting in 5N (99.999 wt. %) Ge. A disadvantage of this process is that the reduction with Zn vapour at a temperature of 930° C. is technologically complex.

In U.S. Pat. No. 4,655,825 Fe chloride and sodium chloride are added to a zinc-aluminium melt, whereby the aluminium reacts with the chlorides and Fe is collected in the zinc melt. It is said that the chloride salts of Ti, Mn, Co, Ni, Cu, Ge, Y, Zr, Mo, Rh, Pd, Ag, Sb, Hf, Pt, Au, Pr, Th, U and mixtures thereof can be processed in the same way.

In the Si metallurgy, direct reduction of $SiCl_4$ by Zn in the vapour or in the liquid phase is known from JP 11-092130 or JP 11-011925. When molten Zn is used, extremely fine powdery metallic Si is formed, which is entrained with the $ZnCl_2$ vapours. This process is however not practical as the separation of the fine powdery Si from the $ZnCl_2$ appears to be problematic.

In U.S. Pat. No. 4,533,387 a process is disclosed for reducing halides of alkali and alkaline earth metals with gallium, indium or thallium. This process is not practical for Ge since the reducing metals used here will generate residual impurities which are unwanted in high purity Ge.

It is an object of the present invention to provide a solution for the problems in the prior art. To this end, and according to this invention, high purity Ge metal is obtained by converting $GeCl_4$ into Ge metal, comprising the steps of contacting gaseous $GeCl_4$ with a liquid metal phase containing a metal M, M being either one of Zn, Na and Mg, thereby obtaining reduced Ge and M-chloride, at a temperature such that the reduced Ge dissolves in the liquid metal phase; separating the M-chloride from the Ge-bearing liquid metal phase; and purifying the Ge-bearing liquid metal phase by processing it at a temperature above the boiling point of M. The metals Zn, Na and Mg are selected because they exhibit the combined characteristics of:

an affinity for chlorine which is higher than that of Ge;
a high solubility of Ge in the molten phase; and
a boiling point which is lower than the boiling point of Ge.

The separation of the M-chloride from the Ge-bearing liquid metal phase can advantageously be performed by evaporation or skimming.

In a preferred embodiment, the steps of (1) cooling the Ge-bearing liquid metal phase to a temperature below the liquidus, thereby forming a Ge-depleted liquid phase and a Ge enriched solid phase, which is separated; and of (2) heating the Ge enriched solid phase to obtain a correspondingly enriched Ge-bearing liquid metal phase, are inserted before the purification step. The Ge-depleted liquid phase is advantageously returned to the $GeCl_4$ converting process.

Above process can be supplemented with steps to recycle M to the $GeCl_4$ converting process by collecting the M-chloride as a liquid, and subjecting it to aqueous or, preferably, molten salt electrolysis, thereby recovering metal M and chlorine. The chlorine can also be reused, in particular for the preparation of $GeCl_4$.

The purification step can advantageously be performed at a temperature above the melting point of Ge (937° C.), preferably under vacuum and at a temperature up to 1500° C. Metal M, which evaporates, can be condensed and recycled to the $GeCl_4$ converting process.

When Zn is chosen as metal M, it is preferably contacted with $GeCl_4$ at a temperature between 750 and 850° C.

According to the current invention, $GeCl_4$ is reduced with a liquid metal M at a relatively low temperature, below the boiling point of M. The technology for this process is therefore much more straightforward than that required for the gaseous reduction process. A Ge-bearing alloy containing e.g. 20 to 60 wt. % of Ge can be obtained, while the chlorinated metal M either forms a separate liquid phase, or evaporates. Metal M can be retrieved from its chlorine, e.g. by molten salt electrolysis, and recycled to the first step of the process. The Ge-bearing alloy can furthermore be purified at high temperatures, above the boiling point of metal M but below the boiling point of Ge itself (2800° C.). The evaporated metal M can be retrieved and recycled to the first step of the process. Any other volatile element is also removed in this step. It is thus possible to close the loop on metal M, thereby avoiding the introduction of impurities into the system through fresh additions.

It should be noted that besides Zn, Na or Mg, metal M could also be Li or K, or a mixture of the any of these elements. The selection of other metals like Al, Ga, In, or Tl as reducing agent for $GeCl_4$ is excluded, since either these metals have a far too high boiling point, and/or their presence, even in ppm quantities, in high purity Ge is totally unacceptable.

A possible enhancement to the process is the insertion of a Ge-alloy enrichment step before the purification step. Cooling the Ge-bearing alloy so as to crystallise either Ge or a Ge-enriched phase involves a significant purification of the Ge, which reduces the energy and time needed in the following purification step.

In a preferred embodiment, gaseous $GeCl_4$ is contacted with liquid Zn at a temperature above the boiling point of $ZnCl_2$ (732° C.). The range between 750 and 850° C. is most preferred. In such conditions, the $ZnCl_2$ formed during conversion is continuously evaporated, whereas Zn losses by evaporation are minimised.

In a typical set-up, the molten Zn is placed in a reactor, preferably made of quartz or of another high purity material such as graphite. The $GeCl_4$, which is liquid at room temperature, is injected in the Zn via a submerged tube. The injection is performed at the bottom of the Zn-containing reactor. The $GeCl_4$, which is heated in the tube, is actually injected as a gas. The end of the injection tube is provided with a dispersion device such as a porous plug or fritted glass. It is indeed important to have a very good dispersion of the $GeCl_4$ in the Zn to get a high reduction yield. If this is not the case, partial reduction to $GeCl_2$ can occur, or some $GeCl_4$ can leave the Zn unreacted. With an adequate dispersion and molten bath height, close to 100% conversion is observed. At the preferred operating temperature of 750 to 850° C., the reduced Ge readily dissolves in the molten Zn up to its solubility limit, which is 50 to 70 wt. %. Further injection of $GeCl_4$ will result in the production of fine Ge particles, which may be entrained and carried over by the evaporating $ZnCl_2$. It is thus advised to interrupt the $GeCl_4$ injection before the Zn saturates with Ge. The other reaction product, $ZnCl_2$, having a boiling point of only 732° C., evaporates and leaves the vessel via the top. The vapours are collected and condensed.

The Zn together with unavoidable trace impurities such as Tl, Cd and Pb can be separated from the Ge-bearing alloy by evaporation. A Ge with a purity of at least 5N is then obtained. For this operation, the temperature is increased above the boiling point of Zn (907° C.), and preferably above the melting point of Ge. It is useful to work at reduced pressure or under vacuum and at a temperature of up to 1500° C. The Zn and its volatile impurities are hereby totally eliminated from the alloy, leaving molten Ge. Only the non-volatile impurities present in the Zn remain in the Ge. Examples of such impurities are Fe and Cu. Their concentration can be minimised by pre-distilling the Zn or by repeatedly recycling the Zn to the $GeCl_4$ conversion process. In such optimised conditions, a Ge purity exceeding 6N can be achieved.

Finally, the molten Ge is allowed to cool down and to solidify as a metallic block. It can also be readily cast in any suitable form.

The following example illustrates the invention. 1700 g of metallic Zn of thermal quality is heated at 800° C. in a quartz reactor. The height of the bath is about 10 cm. A Minipuls™ peristaltic pump is used to introduce liquid $GeCl_4$ in the reactor via an immersed quartz tube. The immersed extremity of the tube is fitted with a porous stone made of aluminosilicate. The $GeCl_4$, which has a boiling point of 84° C., vaporises in the immersed tube and is dispersed as a gas in the liquid Zn. The $GeCl_4$ flow is 160-200 g/h, and the total amount added is 900 g. The $ZnCl_2$, which is formed during the reaction, evaporates and is condensed in a separate vessel connected to the reactor by an insulated quartz tube. Only about 990 g of $ZnCl_2$ is collected as some $ZnCl_2$ remains trapped in the connection tube. A liquid metallic phase containing Zn and about 20 wt. % Ge is obtained. It is sufficient to increase the amount of $GeCl_4$ added, at the same flow-rate of 160-200 g/h, to increase the amount of dissolved Ge in Zn e.g. up to 50 wt. %. This liquid metallic phase is heated to 1050° C. to evaporate the Zn, which is condensed and recovered. To ensure that the Zn has been thoroughly eliminated from the Ge, the temperature is further increased to 1500° C. for one hour. The Ge is then allowed to cool down to room temperature. 290 g of Ge and 1175 g of Zn are recovered. The reaction yield is thus about 95% for Ge. The main impurities in the Ge are P (0.6 ppm), Fe (3 ppm) and Pb (3.8 ppm). The purity can be further enhanced by heating the Ge to 1500° C. in a vacuum furnace, where the volatile impurities such as P and Pb are eliminated.

The invention claimed is:

1. Process for converting $GeCl_4$ into Ge metal, comprising the steps of:
   contacting gaseous $GeCl_4$ with a liquid metal phase containing Zn, thereby obtaining reduced Ge and Zn-chloride, at a temperature such that the reduced Ge dissolves in the liquid metal phase and with an amount such that the liquid metal phase contains between 20-60 wt. % Ge;
   separating the Zn-chloride from the Ge-bearing liquid metal phase; and
   purifying the Ge-bearing liquid metal phase at a temperature above the boiling point of Zn, thereby vaporizing Zn and obtaining Ge metal.

2. Process according to claim 1, wherein the following steps are inserted before the step of purifying the Ge-bearing liquid metal phase:
   cooling the Ge-bearing liquid metal phase to a temperature below the liquidus, thereby forming a Ge-depleted liquid phase and a Ge enriched solid phase, which is separated; and
   heating the Ge enriched solid phase to obtain a correspondingly enriched Ge-bearing liquid metal phase.

3. Process according to claim 1, wherein the step of separating the Zn-chloride from the Ge-bearing liquid metal phase is performed by evaporation or skimming.

4. Process according to claim 1, further comprising the steps of:
   collecting the removed Zn-chloride as a liquid;
   subjecting the Zn-chloride to molten salt electrolysis, thereby recovering Zn and chlorine; and
   recycling Zn to the $GeCl_4$ converting process.

5. Process according to claim 4, further comprising the step of recycling the chlorine to a Ge chlorination process for the production of $GeCl_4$.

6. Process according to claim 1, wherein the purification step is performed at a temperature above the melting point of Ge.

7. Process according to claim 6, wherein the purification step is performed at reduced pressure or under vacuum, at a temperature of up to 1500° C.

8. Process according to claim 1, wherein Zn that is vaporized in the purification step is condensed and recycled to the $GeCl_4$ converting process.

* * * * *

UNITED STATES PATENT AND TRADEMARK OFFICE
CERTIFICATE OF CORRECTION

PATENT NO. : 7,682,593 B2  Page 1 of 1
APPLICATION NO. : 11/663795
DATED : March 23, 2010
INVENTOR(S) : Eric Robert et al.

It is certified that error appears in the above-identified patent and that said Letters Patent is hereby corrected as shown below:

IN THE TITLE:

"GE" should be corrected to read --Ge--.

"GECL$_4$" should be corrected to read --GeCl$_4$--.

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,682,593 B2 Page 1 of 1
APPLICATION NO. : 11/663795
DATED : March 23, 2010
INVENTOR(S) : Eric Robert et al.

It is certified that error appears in the above-identified patent and that said Letters Patent is hereby corrected as shown below:

Title Page, Item (54) and at Column 1, lines 1 and 2

IN THE TITLE:

"GE" should be corrected to read --Ge--.

"GECL$_4$" should be corrected to read --GeCl$_4$--.

This certificate supersedes the Certificate of Correction issued June 29, 2010.

Signed and Sealed this

Twentieth Day of July, 2010

David J. Kappos
*Director of the United States Patent and Trademark Office*